S. C. ROBERTS.
APPARATUS FOR MILLING ALFALFA HAY.
APPLICATION FILED SEPT. 10, 1912.
1,092,801.
Patented Apr. 7, 1914.
2 SHEETS—SHEET 2.
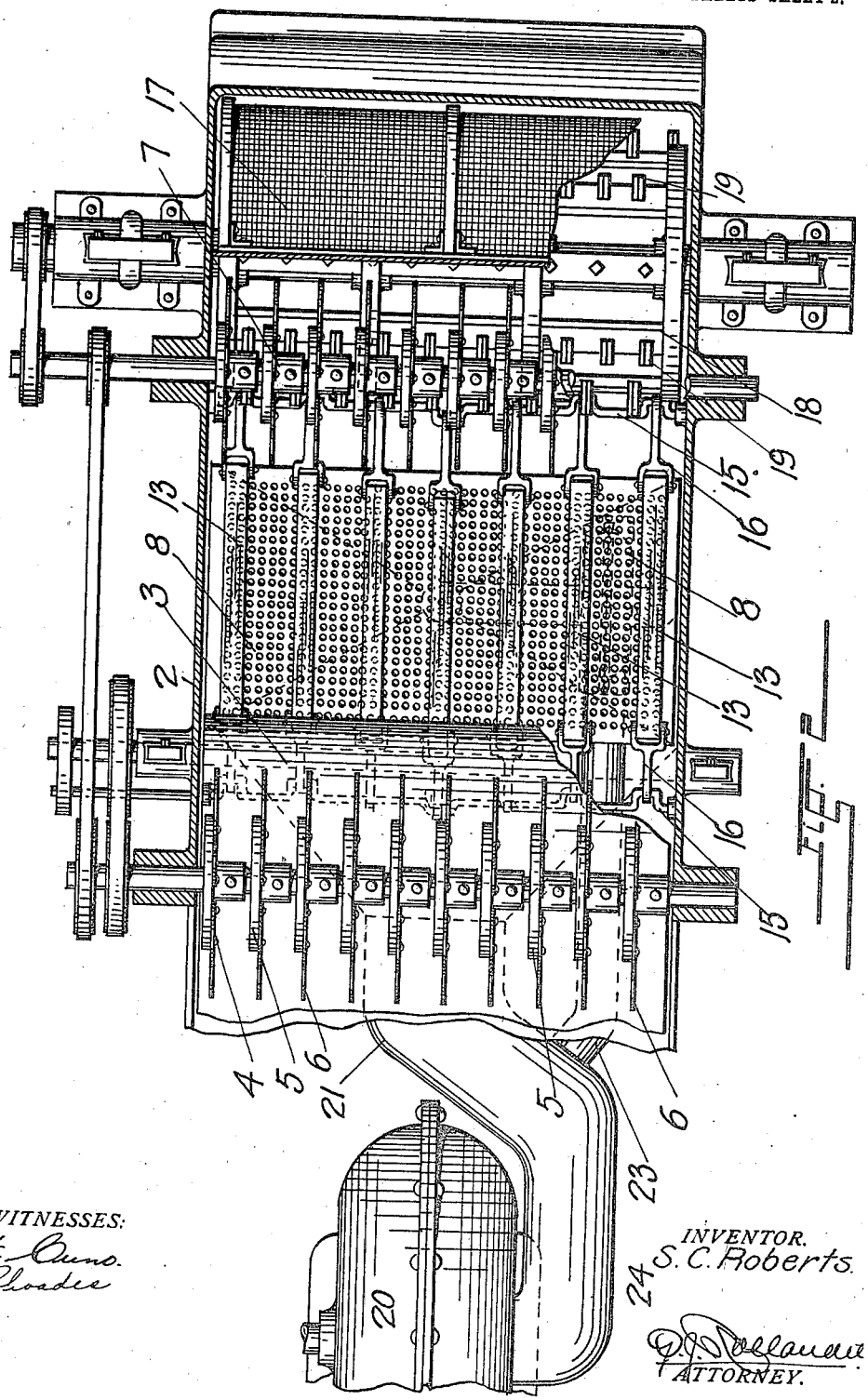
WITNESSES:
INVENTOR.
S. C. Roberts.
ATTORNEY.

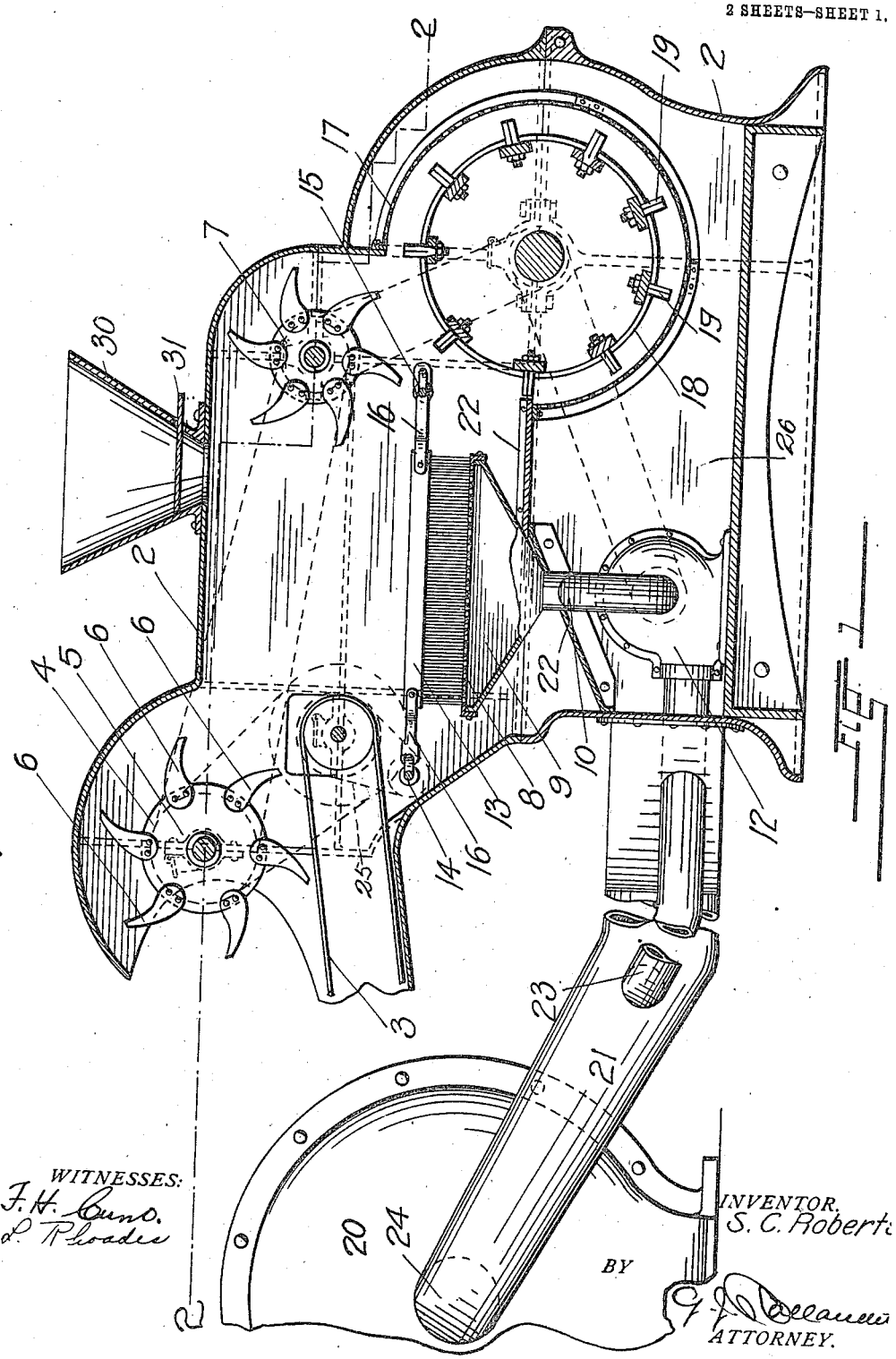

UNITED STATES PATENT OFFICE.

SHERMAN C. ROBERTS, OF DENVER, COLORADO.

APPARATUS FOR MILLING ALFALFA-HAY.

1,092,801.

Specification of Letters Patent. Patented Apr. 7, 1914.

Application filed September 10, 1912. Serial No. 719,547.

*To all whom it may concern:*

Be it known that I, SHERMAN C. ROBERTS, a citizen of the United States, residing at Denver, in the county of Denver and State of Colorado, have invented certain new and useful Improvements in Apparatus for Milling Alfalfa-Hay, of which the following is a specification.

My invention relates to an apparatus for milling alfalfa hay and other forage to produce what is commonly known as alfalfa meal, a fodder suitable for horses and cattle. This ground product of alfalfa hay and the like as at present produced in mills constructed to the purpose, contains a considerable quantity of fine dust which is very injurious to the animals to which the meal is fed. The fine dust contained in the meal is produced by the leaves of the hay, which, being far more brittle than the stalks on which they are grown, are reduced to a fine powder by the mechanical means required to disintegrate the stalks to a meal of the desired fineness. Inasmuch as the leaves contain a large percentage of nourishment, it is not advisable to entirely separate them from the stalks either before or after the hay has been reduced to a meal and it is obviously preferable to reduce the stems and the leaves of the hay separately to products of uniform fineness which when subsequently united will provide a meal in which every part of the plant is contained and which is free from the objectionable dust.

It is the object of my invention to provide an apparatus by which the above mentioned result may be effectively attained, and it consists to this end, in the provision of an association of coöperative devices by which first of all, the leaves are separated from the stalks of alfalfa hay, after which the two substances are separately ground to the desired fineness, and then united to provide a meal of uniform size.

An apparatus suitable to carry the above outlined objects into practice has been shown in the accompanying drawings in the various views of which like parts are similarly designated and in which, Figure 1 represents a fragmentary elevation, partially in section, of the apparatus, and Fig. 2 a horizontal section taken along the line 2—2, Fig. 1.

Referring to the drawings by numerals, 2 designates a casing in which the various elements required in carrying out my invention, are inclosed. The alfalfa hay is fed into the casing 2, upon an endless belt-conveyer 3 which carries it beneath a rotatory cutter 4 which consists of a plurality of disks 5, rigidly mounted on a common axle and each provided with a series of radially projecting, curved knives 6. The latter engage the hay on the conveyer, separate the leaves from the stalks and by their rotary movement, project the stalks onto a second cutter 7 of similar construction, while the leaves by reason of their comparative lightness, remain unaffected by the centrifugal force which impels the stalks, and are in consequence carried onward by the conveyer to be discharged therefrom by gravity onto the foraminous top-plate 8 of a funnel-shaped box 9, which at its lower end is by means of a conduit 10, connected with a suction fan 12. A series of wire brushes 13 have a longitudinal vibrative movement upon the surface of the plate 8, which movement is imparted thereto by means of two parallel crank shafts 14 and 15, the cranks of which are connected with the ends of the brushes by means of pitmen 16.

The brushes 13, serve in the operation of the mill, to reduce the leaves to a fineness determined by the size of the foraminations in the plate 8 through which the disintegrated product is drawn by the action of the suction-fan 12. The stalks of the hay which by centrifugal force, were projected onto the cutter 7, are by action thereof, reduced to small particles before entering the grinding mill in which they are reduced to a meal. This mill consists of a cylindrical screen 17 which at its upper portion, has an opening for the admission of the product discharged from the cutter 7, and within which a rotary cylindrical frame 18 provided with series of outwardly projecting teeth 19, is eccentrically mounted. As the frame 18 revolves, the teeth 19 grind the stalks upon the inner surface of the screen 17 until it has been reduced to the desired fineness when it is drawn through the meshes of the screen by the action of a suction-fan 20, the intake pipe 21 of which connects with the space 26 within the casing 2, surrounding the screen, which is separated from the other portion of the same, by means of a horizontal partition 22.

The discharge pipe 23 of the fan 12 by which the disintegrated leaves are drawn through the foraminous top-plate 8 of the box 9 and which is considerably smaller than that by which the product of the grinding mill is drawn through the screen 17, connects with the delivery pipe 24 of the larger fan, so that the product of the entire process as discharged from the mill, will be a mixture of the stalks reduced to meal, and the disintegrated leaves, which mixture will be of a substantially uniform fineness, and free of the dust invariably produced when the leaves of the alfalfa hay are pulverized by the same means which reduce the stalks to meal.

In case the mill is employed to reduce threshed grain, corn, wheat, oats or barley, the grains thereof may be separately fed into the grinding mill through a hopper 30 to be ground together with the stalks, the flow through the hopper being controlled by means of a sliding gate 31.

The several rotary parts of the machine are coöperatively connected by belts which run over pulleys on their respective shafts as shown in the drawings, and the reciprocating motion of the brush 13 is imparted thereto by the rotary movement of the crank shafts 14 and 15, one of which, 14, is to this end operatively connected with the adjacent shaft of the conveyer by means of a belt 25.

Having thus described my invention what I claim and desire to secure by Letters-Patent is:

1. An apparatus of the class described comprising in combination, means for separating leaves from stalks of alfalfa hay and the like, mechanical means for disintegrating the leaves to a predetermined degree of fineness, and means for reducing the stalks to a meal.

2. An apparatus of the class described comprising in combination, means for separating leaves from stalks of alfalfa hay and the like, mechanical means for disintegrating the leaves to a predetermined degree of fineness, means for reducing the stalks to a meal, and means for uniting the two products.

3. An apparatus of the class described comprising in combination, a rotatory device and a conveyer adapted to coöperatively separate leaves from stalks of alfalfa hay carried on the latter, means for disintegrating the leaves, and means disposed to receive the stalks projected by action of said rotatory device, and adapted to reduce said stalks to a meal.

4. An apparatus of the class described comprising in combination, a rotatory device and a conveyer adapted to coöperatively separate leaves from stalks of alfalfa hay carried on the latter, means for disintegrating the leaves, a rotatory cutter disposed to receive the stalks projected by action of said rotatory device, and means disposed to receive the matter discharged from said cutter and adapted to reduce the same to a meal.

5. An apparatus of the class described comprising in combination, means for separating leaves from stalks of alfalfa hay, mechanical means for disintegrating said leaves, means for reducing the stalks to a meal, and devices for separately removing the products of the said disintegrating and reducing means, and including a common delivery conduit.

6. An apparatus of the class described comprising in combination, a casing having two compartments, a mill for the reduction of stalks of alfalfa hay to meal, adapted to deliver its product into one of said compartments, a suction device for removing said product from said compartment, means for disintegrating leaves of alfalfa hay in the other compartment, and a second suction device for removing the product of said disintegrating means.

7. An apparatus of the class described comprising in combination, a casing having two compartments, a mill for the reduction of stalks of alfalfa hay to meal, adapted to deliver its product into one of said compartments, a suction device for removing said product from said compartment, means for disintegrating leaves of alfalfa hay in the other compartment, and a second suction device for removing the product of said disintegrating means, and having its delivery conduit in connection with that of the first mentioned suction device.

8. An apparatus of the class described comprising in combination, a casing, means in said casing for disintegrating leaves of alfalfa hay, means in said casing for reducing the stalks of said hay to meal, and suction devices for removing the products of said disintegrating means and said reduction means from said casing, and connected with a common delivery conduit.

In testimony whereof I have affixed my signature in presence of two witnesses.

SHERMAN C. ROBERTS.

Witnesses:
G. J. ROLLANDET,
L. RHOADES.